United States Patent [19]
Hoehn-Saric et al.

[11] Patent Number: 5,915,973
[45] Date of Patent: Jun. 29, 1999

[54] SYSTEM FOR ADMINISTRATION OF REMOTELY-PROCTORED, SECURE EXAMINATIONS AND METHODS THEREFOR

[75] Inventors: Rudolph Christopher Hoehn-Saric, Gibson Island; Christopher L. Nguyen; Patrick D. Stevens, both of Baltimore, all of Md.

[73] Assignee: Sylvan Learning Systems, Inc., Baltimore, Md.

[21] Appl. No.: 08/816,039

[22] Filed: Mar. 11, 1997

[51] Int. Cl.⁶ .................................................. G09B 3/00
[52] U.S. Cl. ........................ 434/350; 434/118; 434/323; 434/362; 706/927
[58] Field of Search ................................. 434/118, 169, 434/219, 236–238, 258, 307 R, 308, 322–324, 336, 350–365; 707/104; 704/1; 705/12, 11; 395/927; 706/927

[56] References Cited

U.S. PATENT DOCUMENTS

| | | |
|---|---|---|
| 4,486,180 | 12/1984 | Riley . |
| 4,764,120 | 8/1988 | Griffin et al. . |
| 4,970,655 | 11/1990 | Winn et al. . |
| 5,170,362 | 12/1992 | Greenberg et al. . |
| 5,195,033 | 3/1993 | Samph et al. . |
| 5,204,813 | 4/1993 | Samph et al. . |
| 5,218,528 | 6/1993 | Wise et al. . |
| 5,458,494 | 10/1995 | Krohn et al. ......................... 434/350 X |
| 5,513,994 | 5/1996 | Kershaw et al. ........................ 434/350 |
| 5,565,316 | 10/1996 | Kershaw et al. ........................ 434/322 |
| 5,601,432 | 2/1997 | Bergman et al. ........................ 434/118 |

*Primary Examiner*—Joe H. Cheng
*Attorney, Agent, or Firm*—Griffin, Butler, Whisenhunt & Szipl, LLP

[57] ABSTRACT

A system for controlling the administration of remotely proctored, secure examinations at a remote test station, and a method for administering examinations. The system includes a central station, a registration station and a remote testing station. The central station includes (a) storage device for storing data, including test question data and verified biometric data, and (b) a data processor, operably connected to the storage device, for comparing test taker biometric data with stored, verified biometric data. The remote test station includes (a) a data processor, (b) a data storage device, operably connected to the data processor, for storing input data, (c) a biometric measurement device for inputting test taker biometric data to the processor, (d) a display for displaying test question data (e) an input for inputting test response data to the processor, (f) a recorder for recording proctoring data of a testing event, and (g) a communication link for communicating with the central station, for receiving test question data from the central station, and for communicating test taker biometric data, test response data, and proctoring data to the central station. Verification of the test taker and validation of the results can be performed either before or after the testing event.

37 Claims, 4 Drawing Sheets

SYSTEM FOR ADMINISTRATION OF REMOTELY-PROCTORED, SECURE EXAMINATIONS AND METHODS THEREFOR

BACKGROUND OF THE INVENTION

The present invention relates to a system for controlling the administration of remotely-proctored, secure examinations at a remote test station, and a method for using the system to administer remotely-proctored, secure examinations.

In administering secure, proctored examinations such as the SAT, GRE, GMAT, MCAT, LSAT, professional qualification examinations, and other such examinations, much time and effort is spent ensuring the integrity of the examination. First, the test taker must be properly registered. It is essential that only those persons who are qualified are registered to take the examination. Second, it is important to ensure that only persons who are registered are allowed to take the examination. The integrity of any test is damaged, of course, if tests are taken by persons other than those who are properly registered. It is also important that the test be properly proctored to ensure that cheating does not take place. Lastly, the test question information must be secure from theft, unauthorized access and alteration. All of the above security measures require significant expense and manpower.

Ensuring the integrity of an examination becomes even more burdensome when the examination is given at a number of remote sites. It has thus long been desired to automate the above security measures to allow the efficient, cost-effective and secure administration of tests at remote locations.

Attempts have been made to achieve some of these goals in related areas of technology. U.S. Pat. No. 4,486,180, to Riley, discloses a system for the administration of driver's tests. This patent discloses an automated booth for taking driver's test, but the system is limited to driver's tests and is not sufficiently comprehensive and secure to administer a large number of different standardized tests at a large number of remote test sites.

U.S. Pat. Nos. 5,195,033 and 5,204,813, both to Samph et al., disclose testing systems in which a central computer is connected to a number of assessment centers for the administration of tests. However, the systems disclosed in these patents are insufficient to ensure the verification of test takers and the security of the test question data.

U.S. Pat. No. 4,764,120, to Griffin et al., discloses a student response system which centrally processes student response data from a number of classrooms. However, the system disclosed cannot meet the strict validation, proctoring and security requirements of most standardized tests.

U.S. Pat. No. 5,218,528, to Wise et al., discloses an automated voting system in which voters are registered and certified, but it does not provide a system with sufficient security for test question data.

The present inventors have developed the current state of the art computer network used to deliver computerized standardized examinations. Years of development time and millions of testing events have proven the existing system to be a sound and robust method of testing. The current system involves a software platform which delivers an exam on local networks which are supported world-wide by a centralized master network. The master network downloads the exams to the testing centers, and picks up the completed test files after the exam has been completed by the candidate.

This current network utilizes registration centers which employ registrars who answer phone requests from candidates and manually enter in personal demographic information, test selection, and payment information. These registrars schedule the candidate into a specific testing center location on a specific day and time.

The test centers are comprised of local networks on which the exam is delivered to the candidate. System administrators employed at the test centers check-in the scheduled candidate, and confirm the candidates identity by verifying official forms of identification. Once this is completed, the candidate is seated at a designated testing station, where the administrator will launch the examination process. The Administrators proctor the examination event to ensure that the candidate does not use any supplementary items to cheat on the exam, and are available to respond to any problems which occur.

Despite its advantages, the current state of the art nonetheless requires significant manpower to register persons for examinations, to ensure that only registered persons take the exams, to proctor examinations, and to secure the test question data.

BRIEF SUMMARY OF THE INVENTION

An object of the present invention is therefore to take the current state of the art test delivery system, and to automate the process to the greatest extent possible, thus eliminating the need for support personnel at the test site.

Another object of the present invention is to develop a Self-Testing Kiosk, a remote testing station which integrates the necessary software and hardware to provide a completely unmanned remote test station. The entire process is then automated such that a candidate who wishes to take an examination may register, schedule, and complete the test without the need for any personnel on-site. A testing center of this type is used to deliver virtually any type of computerized examination.

In accordance with the above objects, the present inventors have provided a novel system for controlling the administration of remotely proctored, secure examinations at a remote test station. In its most basic embodiment, the system comprises (1) a central station and (2) a remote testing station.

The central station includes (a) storage means for storing data, including test question data and verified biometric data, and (b) a data processor, operably connected to the storage means, for comparing test taker biometric data with stored, verified biometric data.

The remote test station comprises (a) a data processor, (b) a data storage means, operably connected to the data processor, for storing input data, (c) a biometric measurement device for inputting test taker biometric data to the processor, (d) display means for displaying test question data (e) an input for inputting test response data to the processor, (f) a means for recording proctoring data of a testing event, and (g) communicating means for receiving test question data from the central processor, and communicating test taker biometric data, test response data, and proctoring data to the central station.

In accordance with a preferred embodiment, the proctoring data is audio/visual data of the testing event. The proctoring data preferably includes an audio/visual record of (a) input of test taker biometric data and (b) input of test response data. The proctoring data preferably further includes a still picture of the test taker.

In yet another embodiment, the system also has a registration station in addition to the central station and the remote testing station. The registration station comprises (a) a data processor for processing and verifying registrant data, (b) storage means for storing data sufficient to verify registrant data, and operably connected to the processor, (c) a biometric measurement device for inputting registrant biometric data; and (d) communication means for communicating verified test registration data, including verified biometric data to the central station.

The registration station and the testing station can either be remote or proximate to one another. In one embodiment, the registration station and testing station can be combined in one station.

In another aspect, the invention provides a method for controlling the administration of remotely proctored, secure examinations at a remote testing station. The method comprises the steps of (a) storing verified biometric data at a central station; (b) storing test question data at the central station; (c) inputting test taker biometric data at the remote testing station to begin a testing event; (d) communicating the test taker biometric data to the central station and comparing the test taker biometric data with the verified biometric data to thereby verify the test taker data; (e) communicating test question data from the central station to the remote test station; (f) storing test answer data input in response to the test question data; (g) recording and storing audio/video proctoring data of the testing event, assigning the identifier to the proctoring data; (h) ending the testing event; and (i) validating the testing event by reviewing the proctoring data for invalidating events. In one embodiment, the method further includes the step of assigning a unique identifier to the testing event.

In an alternative embodiment, the proctoring data is evaluated and the testing event validated during the event itself. In that way, the test-taker can walk away from the event with a validated record of the test score.

In another preferred embodiment, the testing station is a kiosk, or self-contained unit inaccessible without input of test registration data. A second communication means for permitting a test taker to communicate with the central station can be provided inside the kiosk.

In one embodiment of the present invention, the remote testing station can be a kiosk installed into a public access facility, allowing a candidate complete a particular exam without any outside assistance. In a further embodiment, the candidate may register and schedule the examination in the kiosk as well. Registration and scheduling may also be performed at a separate registration site. Essential to the registration aspect of the present invention is that the registration results in the storage of verified biometric data in a central site, in order to later ensure that only properly registered persons are allowed to take any given test.

The kiosk is preferably a free standing unit which is installed into an existing building and taps into the building's HVAC, phone, and electrical systems. Hardware included in the Kiosk allows a candidate to enter registration data, personal biometric data, and then to receive test question and complete a test in a private, secure testing station. To minimize any distractions to the candidate, each testing station preferably incorporates sound isolation features. In a preferred embodiment, access to each individual testing station is electronically controlled by the automated system.

Each kiosk is remotely supported by a singular central station. The network utilizes state of the art telecommunication methods to remotely update and maintain the local testing networks. Technical support for the remote registration and testing stations is provided by the central station. The central station may be used to respond to any candidate problems while completing an exam. Eligibility based testing, in which only pre-selected candidates have the right to take a specific exam, can also be controlled from the central station.

The remote testing station of the system also features a variety of security measures designed to eliminate the possibility of cheating during the testing process. First, there is a biometric data measuring device. Devices used in the system according to the present invention include those which record a candidate's fingerprint image, retinal image, or hand geometry image, as well as voice recording and analysis devices. The presently-claimed system also allows test scores to be validated by the central station. For example, printed score results which contain the candidate's photo image can be printed on non-alterable, non-reproducible paper, verified by an official Notary Republic. A unique, seemingly random number produced by a coding algorithm is assigned to the test response data, and proctoring data as the test is taken to validate the testing event. Verification and invalidation can be achieved either during the test, or afterwards.

In summary, the present invention automates the test taker verification, test delivery, proctoring and test validation processes. It eliminates the need for on-site personnel to support the system, and provides a secure and private testing environment. It makes computerized testing much more readily available to the potential testing candidates, and allows them to register and schedule themselves at a convenient time. It also allows test-givers, be they employers or qualifying organizations, to administer secure, verified tests with a minimum of overhead and other expenses.

The objects, features and advantages of the present invention will be readily apparent to those of ordinary skill in the art upon review of the Detailed Description of the Preferred Embodiments which follows, when considered in view of the attached drawings.

DETAILED DESCRIPTION

Figure 1:
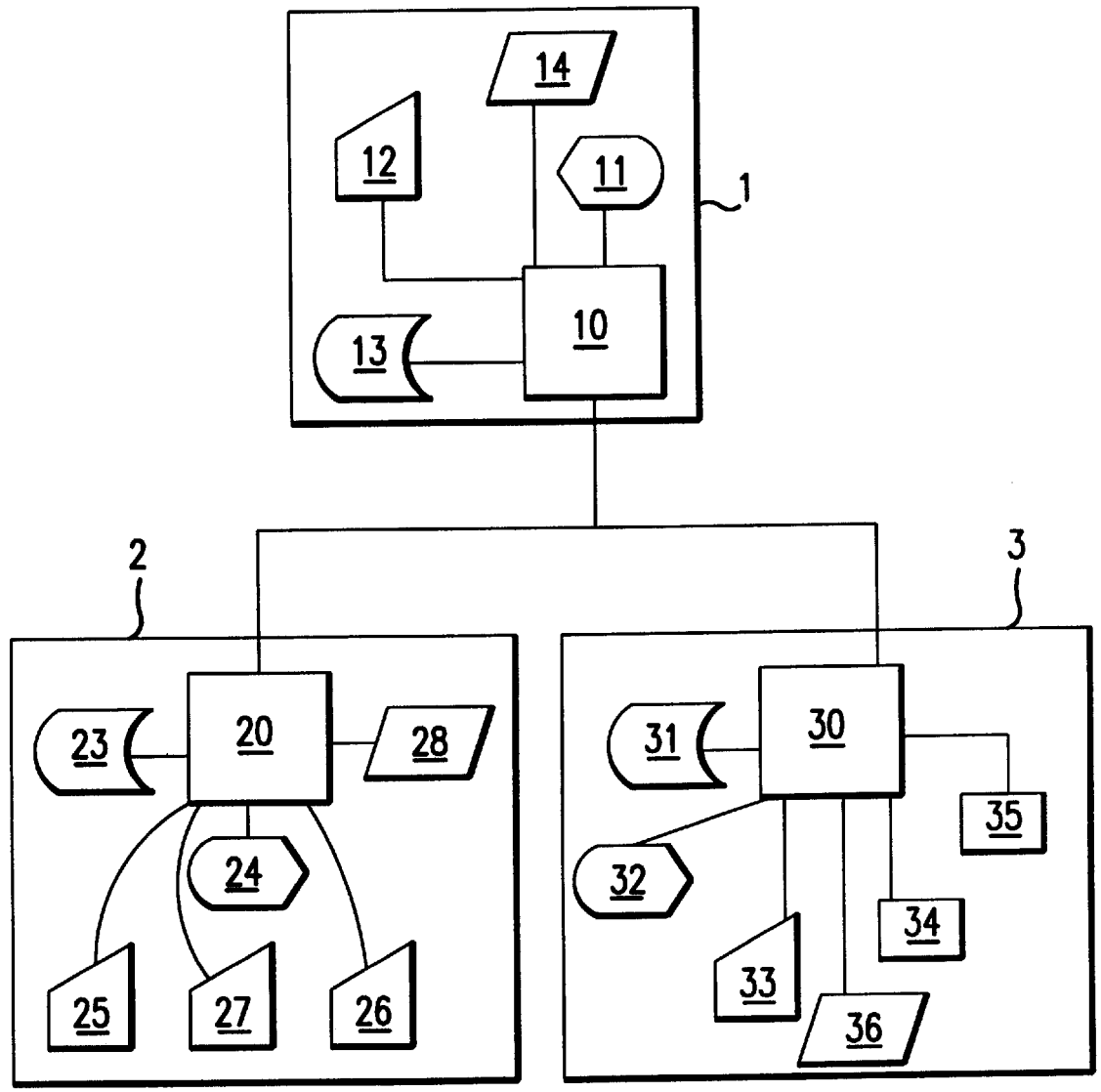
FIG. 1 is a block diagram of the hardware of the system according to the present invention.

FIG. 1 is a block diagram showing the hardware of a system according to the present invention for controlling the administration of remotely proctored, secure examinations at a remote test site. The central station 1 comprises a data processor 10. A display 11 is provided for allowing personnel to monitor the administration of tests at remote sites, and the functioning of the system in general. An input 12, such as a keyboard, is provided to allow control, updating and management of the system. A printer 14 is provided for those embodiments of the invention in which test results are verified after the testing event and verified test results are sent to the test taker from central station 1.

Central station 1 is connected to communicate with a registration site 2. Any appropriate data link can be used to connect the central station 1 with registration station 2. Registration site 2 includes a data processor 20, connected to a display 24 and a storage device 23. An input 25, such as a keyboard, card reader, bar code reader, etc., is provided to allow the input of registrant data, which is then compared with stored data to determine if the registrant qualifies to be registered for a particular examination. An optional credit card input 27 may be provided to allow credit payment for the registration. A biometric measurement device 26 is provided to record biometric data such as an image of candidate's fingerprint, a retinal image, a voice print, hand geometry, or other biometric data capable of identifying an individual, including photographs or digital images. A printer 28 advantageously can be provided. As is discussed below, in the registration process, the verified biometric data is transferred to and stored by the central station 1 for later comparison with test taker biometric data, to verify that the test taker has been properly registered for a particular examination.

The remote test site 3 comprises a data processor 30, connected to be able to communicate with the central station 1. The communication means can be a modem and a telephone line, an ISDN connection, a satellite link, or some other appropriate data link. If the connection is broadcast or is a data link over the internet, then special encoding and decoding software would be necessary to ensure security of the data transmitted. A storage device 31 is provided for storing data required for the initiation of the testing event. A display 32 is provided for displaying test question data received from the central station 1, and an input 33, such as a touch screen, a keyboard, a pen device, or other input, etc., is provided for the input of registration data and test response data by the test taker. In an embodiment where registration data is entered by means of a registration card, a bar code reader or the like (not shown in FIG. 1) is also provided. A biometric measuring device 34 is provided to allow the test taker to input test taker biometric data. As described below, the test taker biometric data is communicated to the central station 1 and compared with the verified biometric data stored in storage device 13 before the testing event is begun.

Lastly, the remote site 3 has a means for recording and inputting proctoring data 35. In the preferred embodiment, the proctoring data is an audio/visual record, particularly, a record of the input of test taker biometric data and the input of test response data during the testing event. In one example, a video camera is placed in one corner of a self-sufficient testing kiosk and creates an audio/visual record of the entire testing event. How the proctoring data is used to validate or invalidate a testing event is discussed below. In short, however, the proctoring data may be evaluated during the testing event, after the testing event or both during and after.

In a preferred embodiment, the remote testing site 3, is a kiosk, or free standing structure designed to be installed into existing public access buildings. The kiosk could be in the lobby of a public building in a shopping mall, or in an airport or train station. The kiosk in this embodiment taps into the host facility's electrical, phone, and HVAC systems. The registration station 2 may be remote from or proximate to the kiosk which comprises the remote testing station 3. If registration and testing are performed at the same site, input devices must be provided both for entering (1) information required for registration, including, eg., identification information, demographic information, payment information, and test selection; and (2) information for the testing event, including, eg., registration, biometric and test response data.

In the Kiosk embodiment, the structure is a free standing, light weight unit; designed to be installed into open space areas of public access facilities. It is a semi-permanent enclosure which can be assembled in a short time, and does not require major build-out modifications to its host facility. Electrical and phone lines are routed into the unit, as required, from the host facility's infrastructure. If necessary, the host facility can be used to fulfill any HVAC requirements of the kiosk. An ancillary HVAC supply can also be utilized if necessary. If a smaller, more controlled space is available, such as a store unit in a shopping mall, a modified unit can be installed which achieves the same level of security.

In the Kiosk, the remote testing site 3 can comprise a single testing station or a plurality of stations. The stations would each be provided with a door which remains locked at all times, secured with an electronically controlled lock 36. The door will unlock only after a test taker has successfully completed registration and has checked-in using input devices external to the station. Once the test taker has entered the testing station, the door remains locked from the outside to ensure security and privacy for the test taker. The door is not locked from the inside, allowing the candidate to leave at any time, however the lock would create a signal which would become part of the proctoring data. Any unauthorized opening of the door during the testing process can, if desired, become an invalidating event which would end or invalidate the testing event.

Preferably, the walls of the kiosk comprise a sound absorbent material to provide the test taker with a quiet, undisturbed testing event. 'White-noise' generators can be implemented if ambient noise from the host facility is a source of distraction. Speakers located in each test station, driven by a common amplifier, provide low level sound which masks any distracting noises.

The inside of the kiosk consists of a shelf on which the various required input devices and display are located. There is shelving provided for the test taker's personal possessions. Lighting appropriate for computerized testing is installed in each test station.

A computer such as a personal computer, including the data processor 30 and storage device 31 is preferably held in a locked compartment within the station.

In the preferred embodiment, the device 35 for recording proctoring data is a video camera used to monitor and record the testing event, is mounted in one corner of the testing station. The audio/visual recording of the session is used to document the entry of biometric data and test response data, to record any problems or abnormalities that may occur during the testing event, and to prevent the test taker from cheating.

In one embodiment, evaluation of the proctoring data can take place during the testing event. In this embodiment, the audio/visual proctoring data can be transmitted to central station 1 and displayed on display 11 so that an administrator can view the testing event, end or invalidate the event if necessary, or respond to any problems during the testing event. The audio/visual proctoring data is also preferably digitally recorded, transmitted to the central station 1 and stored for use in later validation of the testing event. The device 35 is also used to capture a still image portrait of the testing candidate. This image will be become part of the proctoring data and is stored for candidate identification or test validation purposes.

The biometric measuring device 34 is selected from a wide variety of available devices including: fingerprint recording devices that capture a digital image of candidate's fingerprint; retinal image recording devices, voice print devices, hand geometry recording devices, and others. As discussed above, the biometric measuring device 34 can be combined with a camera so that a photograph or digital image becomes part of the biometric data.

It is desirable to have one input device be a microphone or handset that can be used by the test taker to communicate with the central station 1. In other words, the test taker and the remote proctor can communicate with one another via a dedicated communication channel, e.g., a telephone line 100 connecting a pair of handsets 102 and 104. Two-way video communication is also desirable in certain instances.

The test question data is stored at the central station 1 for security purposes, and communicated to testing station 3 at an appropriate point in the testing process, as will be discussed below. The central station 1 also stores the verified biometric data of the registrants to be used in test taker verification and validation of the test taker data. Test response data are transmitted to the central station 1 for storage, and, in one embodiment, for later validation of test taker data.

On-line administrators and technicians provide operational and technical support to the remote testing stations 3 from the central station 1 using whatever communications method (data, voice, or two way video) necessary to accomplish the task. All software upgrades and revisions to the system are performed from the central station 1 using the communications lines connecting the central station 1 with the registration station 2 and remote testing station 3.

Registration

Registration for the test will now be described with reference to the preferred embodiment shown in the flow chart of FIG. 2.

Upon arrival at the registration station 2, a registrant presents identification in step 40 which is input in step 41 into processor 20 by means of input 25. Other qualification information is then requested in step 42 and input in step 43. Depending on the type of test for which the registrant wishes to be registered, as input in step 44, either the processor 20 of the registration site, or the processor 10 of the central station determines whether the registrant is qualified in step 47. If the test is determined to be an eligibility type test at step 45, the registrant's data is communicated to the central station at step 46 before performing step 47. If the registrant is not qualified, the registration is stopped at step 48. If the test is not an eligibility test, then the processor 20 of the registration site 2 is instructed to qualify the registrant of step 47.

If the registrant is qualified, the input of biometric data is requested in step 49. After the input of biometric data, payment is collected in steps 50, 51 and 52. If payment is by credit card, approval needs to be obtained in step 51. If payment is by cash, then cash or a check is collected in step 52. If the payment collection is confirmed at step 53, then a testing event is scheduled at step 54, and the biometric, and other personal data of the registrant is sent to the central station 1 at step 55. Steps 54 and 55 can also take place in reverse order, if desired. The scheduling step 54 will also typically include the input of data such as the preferred time and place at which the registrant desires to take the test. If the test is scheduled to take place directly after registration at step 56, then the registrant goes directly to step 62 of the testing event shown in FIG. 3. If the test is taken at a later date, a registration card is printed using printer 28, or registration number issued at step 57 and the registration completed at step 58. The registration card, or number can be used in the check-in process at the start of the testing event illustrated in FIG. 3. If payment is not collected at step 53, the registration is ended at step 48.

In an embodiment where the registration station 2 is proximate to, or integrated with the testing station 2, it is possible for testing to directly follow registration at the same site, assuming that a testing station 3 is free.

Other registration processes are envisioned as long as they result in the recordation of verified biometric data, and the communication of the verified data to the central station 1.

Figure 2:
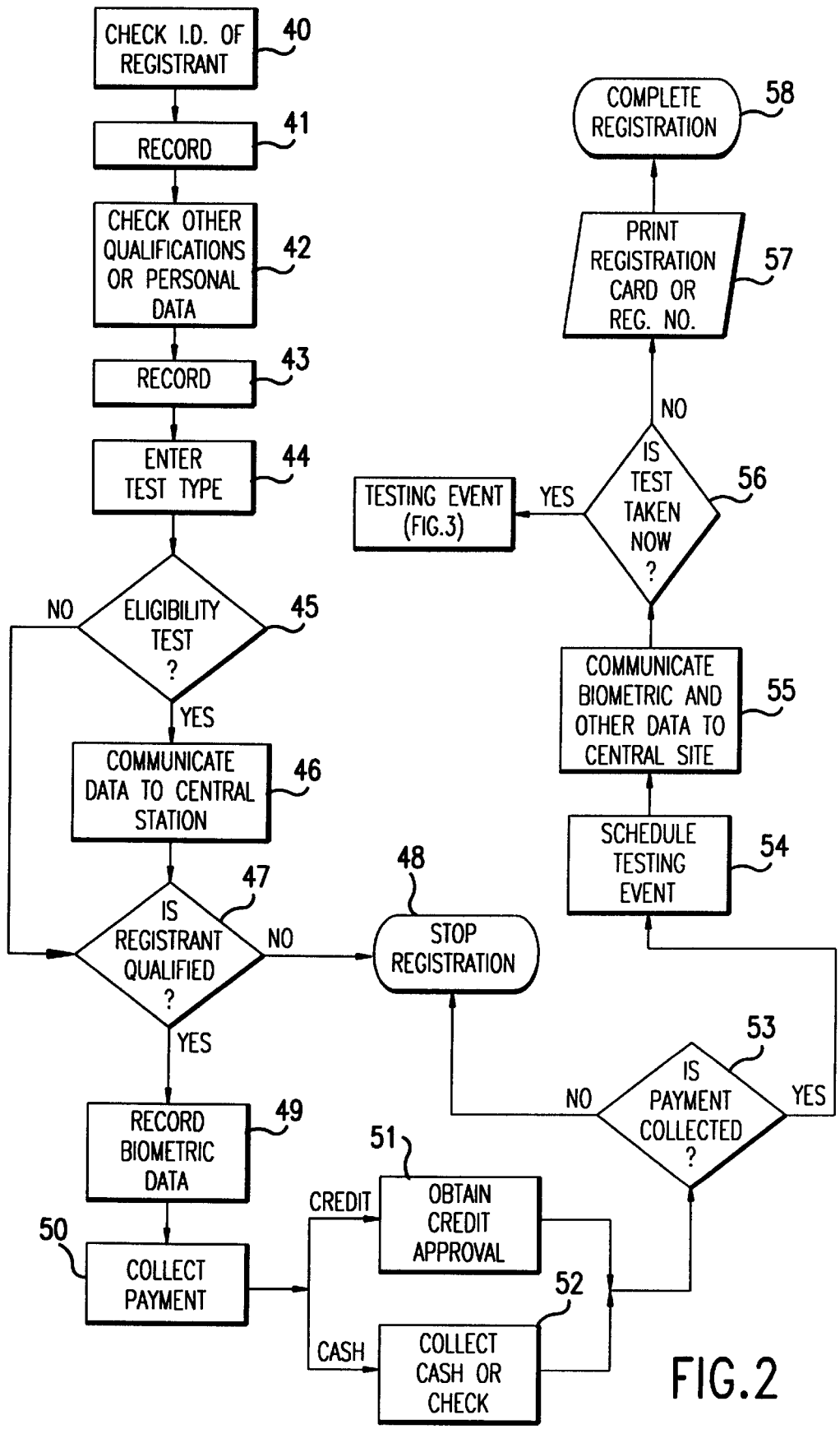
FIG. 2 is a flow diagram of one embodiment of the registration process according to the present invention.

As should be apparent from the flow chart of FIG. 2, the registration process is entirely, or at least substantially automated.

The Testing Event

The testing event will be described with reference to the preferred embodiment of FIG. 3.

The testing process begins, upon arrival of the test taker at the remote testing station 3, with a request of the test taker to present a registration card printed during the registration process, or enter a registration number during step 60. In a preferred embodiment, the request for registration card or registration number stated on the card is made at a display outside of a kiosk in order to open the door. For this purpose, a display and a card reader are provided outside the kiosk. Otherwise, the prompt is given on display 32 of the remote testing site 3 and card information may either be entered by the registrant with input 33, or a special input, such as accord reader, may be provided for that purpose.

If the card is determined to be valid at step 61, and the test taker is verified as a valid registrant, then the recording of audio/visual proctoring data begins at step 62, and the test taker is asked to enter biometric data at step 63. For example, the test taker is asked to face the video camera for the taking of a still picture or the taker is asked to place his hand or finger in suitable recording device.

In this embodiment, if there is an invalidating event while the biometric data is being measured (step 64) then the testing event is invalidated and the test stopped. An invalidating event could be, for example, the presence of two persons in the remote testing station, or an attempt to improperly or fraudulently enter biometric data. Typically, the types of occurrences or data which would constitute invalidating events would vary depending on the particular test and level of security required. The proctoring data may include more than audio/visual data, such as a signal from an electronic door lock, etc., in which case, an invalidating event could be an unlocked or opened door signal. If there is no invalidating event, then the biometric data is communicated to central station 1 in step 65 and compared at step 66 with verified biometric data stored in the storage device 13.

If the communicated test taker biometric data matches the verified biometric data corresponding to the proper registrant (step 67), then test question data is communicated to remote test site 3 (step 69). Steps 70, 71 and 73 represent the entry of test response data by the test taker in response to question data displayed in display 32. If at any point during the entry of test response data an invalidating event occurs (step 72), as determined by analysis of the proctoring data, then the testing event is stopped and/or invalidated (step 68). As disclosed above, invalidating events would include the opening of the kiosk door by the applicant, unauthorized use of notes or reference materials, or unauthorized communication between the test taker and someone outside the kiosk.

After all questions have been answered (step 73) the test taker is given the option of reviewing the questions (step 74), or completing the test (step 76). In step 77 a unique identifier is assigned to the testing event for use in coordinating test response data and proctoring data for the testing event. Thereafter, the test response data is communicated to the central station 1 at step 78.

A record of the testing event is then printed for the test taker at step 79. In one embodiment, because the proctoring data is used to validate the testing event during the event, a verified test result can be given to the test taker at step 79.

In another embodiment, the proctoring data is analyzed and the testing event validated after the event, in which case the test taker is given only a record of having completed the testing event at step 79, and is given a validated test result subsequent to the end of the test at step 80, such as by the printing of an Official Score Report Form.

While not specifically described here, it is also possible to have the registration take place after the testing event at the same time as or in conjunction with validation.

In a further embodiment, two way communication is provided between the test taker and the central station 1. This two way communication would also be recorded and stored as proctoring data. Such a communication link allows the test taker, for example, to request a pause in the testing event for a restroom break, or to communicate technical problems or questions regarding the system. In very secure tests, steps 60 through 67 may be required to be repeated after even an authorized interruption.

A tutorial can also be provided either before, or during the testing event, to allow the test taker to become familiar with the functioning of the system.

At the conclusion of the testing process, data are transmitted back to the central station 1. These data would include some or all of the following: the test response data, audio/visual proctoring data, a still picture of the test taker, and registration data. If, as described above, the testing event is validated during the event, the results are then processed and a printed record is produced.

The printed record includes some or all of the following: the test taker's personal information and qualification data, the still picture of the test taker as well as any other physical characteristics recorded, the test response data, the pass/fail status and percentage score. Whether printed at the remote station 3 or at the central station 1, the record is printed onto an Official Score Report Form which is printed on specially formulated security paper. This security paper utilizes safeguards to prevent alteration or duplication by the student. The paper bears a distinctive logo as a watermark and is printed on colored paper.

The record preferably also contains the identifier assigned to the testing event and the test data. This identifier is preferably a seemingly random number produced by a unique algorithm. The algorithm utilizes input variables which are derived from, among other things, the registration and qualification data, the date and time of the testing event, the test taken, and the response data or score. Thus, the identifier is unique to the testing event, and can be used to authenticate a valid score report, thus preventing the test taker, or anyone else, from creating a falsified report.

In a further embodiment, where the report is generated at the central station 1, the preliminarily validated report is first mailed to the test taker. Thereafter, in order to complete validation of the testing event and score, the candidate must have the document notarized by an Official Notary of the United States. Instructions on the document inform the notary that they must first verify that the personal data and picture on the document indeed match the actual person. A list of acceptable forms of identification is included on the score report. Once the identity of the test taker has been confirmed, the notary places the official notarization seal on the document, taking care to overlap part of the seal onto the test taker picture.

In this embodiment, the score result must then be mailed back to the central station 1. Once the returned document has been inspected and authenticated by the central station 1, the test is deemed completely validated. The results are then relayed to the test taker, and the testing organization responsible for the test.

Figure 3:
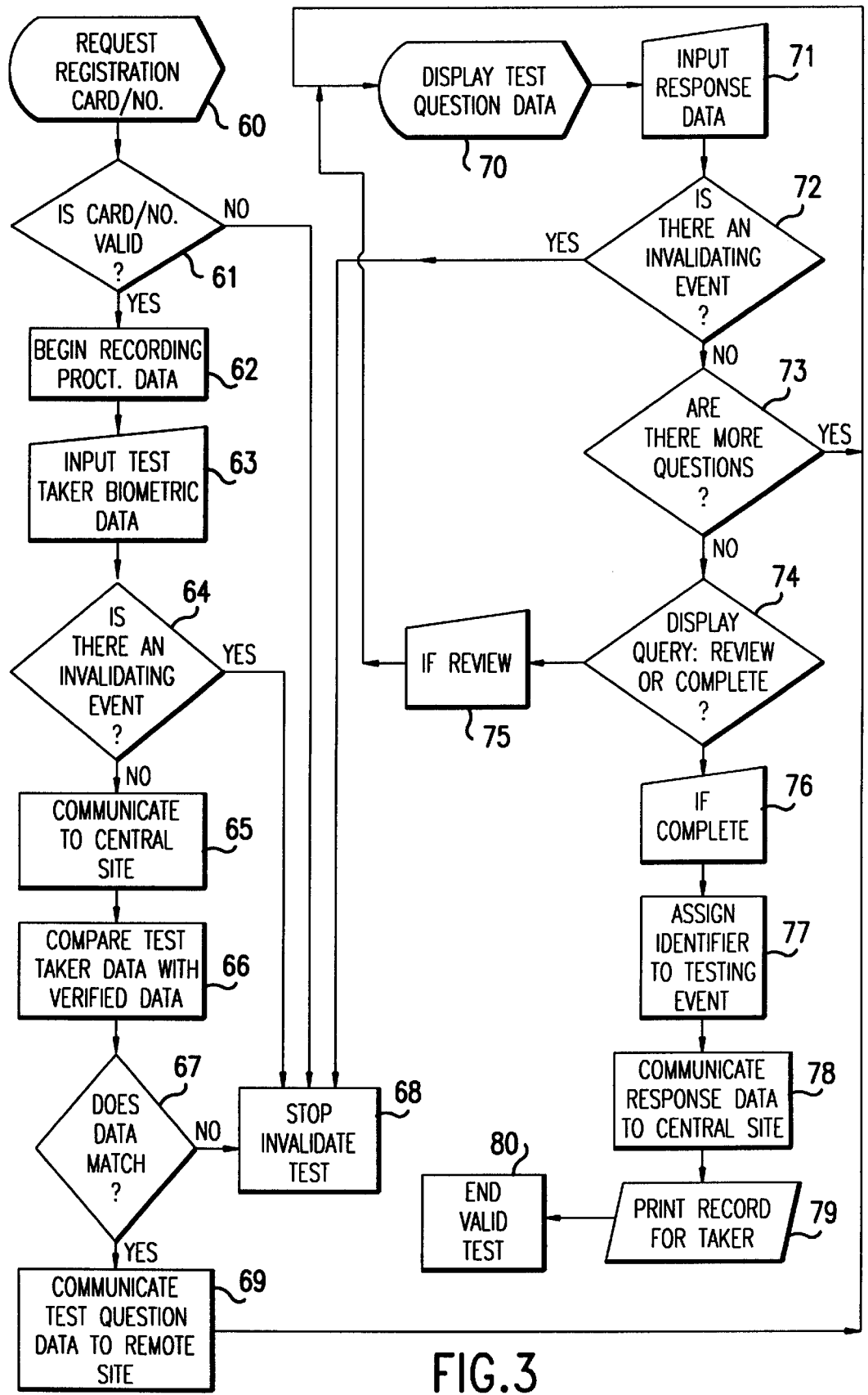
FIG. 3 is a flow diagram of one embodiment of the test taking process according to the present invention in which the testing event is verified during the event.
Figure 4:
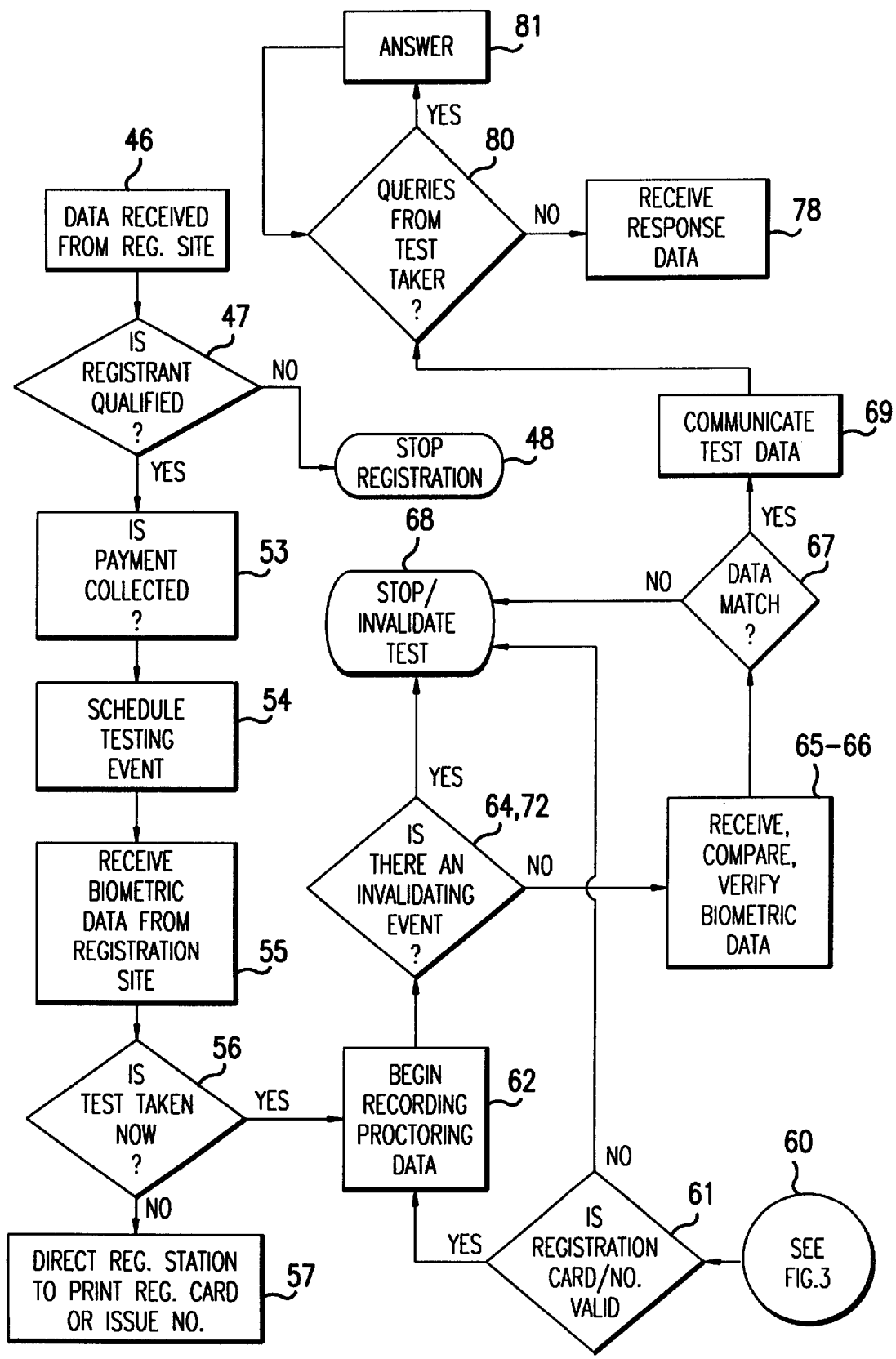
FIG. 4 is a flow diagram of the central site activity during registration and testing in the embodiment of FIGS. 3 and 4.

In order to better understand the interplay of the central station and the remote registration/testing sites the steps which may be carried out at the central station in FIGS. 2 and 3 are illustrated in FIG. 4. Similar method steps in FIG. 4 bear similar reference numerals. Data is received from the registration site at step 46, and the central site can determine if the registrant is qualified at step 49. If necessary, the central site may stop registration at step 48. Collection of payment is verified in step 53, the test is scheduled in step 54 and the biometric data is received from the registration site at step 55.

If the central site determines that the test is taken now at step 56 then it may begin the recordation of proctoring data for the testing event at step 62. If the test is not taken directly after registration, a registration card is printed or a number issued at step 57. In cases where the test is taken at a time removed from the registration event, the central station's first step is to determine if the registration card or number entered at the test site is valid at step 61.

In embodiments where verification takes place during the testing event, the central station may then determine if there has been an invalidating event at steps 64,72, and proceed to stop the testing event at step 68 if there has.

The central station receives, compares and verifies the biometric data in steps 65–67, and if the data matches, the test data will be communicated at step 69 to the testing station.

In another contemplated embodiment, the test data already resides in the storage device 31 of the test site 3. In this embodiment the test data residing in storage device 31 would be unlocked at step 69 under instructions from the central station 1.

In the embodiment shown in FIG. 4, the test taker is permitted to address queries to the central station at step 82 and receive answers at step 83. The central station then receives the test response data at step 78, and prints a record at step 79. As discussed above, the record may also be printed at the remote test site if the test is validated during the event.

The present system has been illustrated with respect to a few preferred embodiments, but one of ordinary skill in the art will recognize that deletions, additions, substitutions, and improvements can be made while remaining within the spirit and scope of the present invention. The scope of the invention is determined solely by the appended claims.

What is claimed is:

1. A system for controlling the administration of remotely proctored, secure examinations at a remote test station, comprising:

(1) a central station including (a) a storage device which stores data, including test question data and verified biometric data, and (b) a first data processor, operably connected to said storage device, for comparing test taker biometric data with said verified biometric data; and (2) a remote test station comprising (a) a second data processor, (b) a data storage device, operably connected to said second data processor, which stores input data, (c) a biometric measurement device which generates said test taker biometric data (d) a display which displays test question data, (e) an input for inputting test response data (f) a recording device generating proctoring data of a testing event, and (g) communicating circuitry which communicates with said central station, for receiving test question data from said central station, and for communicating said test taker biometric data, said test response data, and said proctoring data to said central station, wherein said biometric measurement device, said display, said recording device and said communication circuitry are operatively coupled to and controlled by said second data processor.

2. The system according to claim 1, wherein said proctoring data comprises audio/visual data of said testing event.

3. The system according to claim 2, wherein said proctoring data includes an audio/visual record of (a) input of said test taker biometric data and (b) input of said test response data.

4. The system according to claim 3, wherein said proctoring data further includes a still picture of a test taker.

5. The system according to claim 1, further comprising a registration station, comprising:

(a) a third data processor for processing and verifying registrant data;

(b) a registration storage device which stores data sufficient to verify registrant data and subsequently generated verified test registration data operably connected to said third data processor;

(c) a biometric measurement device for inputting registrant biometric data to thereby generate verified biometric data; and (d) communication means for communicating said verified test registration data, including verified biometric data to said central station for storage in said storage device.

6. The system according to claim 5, wherein said registration station and said testing station are in the same place.

7. The system according to claim 1, wherein said testing station is a self-contained unit, inaccessible without input of test registration data.

8. The system according to claim 7, wherein said recording device generating proctoring data of a test event includes a video camera disposed inside said unit.

9. The system according to claim 7, further comprising dedicated circuitry for permitting a test taker to communicate with said central station.

10. A method for controlling the administration of remotely proctored, secure examinations at a remote testing station comprising the steps of:

(a) storing verified biometric data at a central station;

(b) storing test question data at said central station;

(c) inputting test taker biometric data at the remote testing station to begin a testing event;

(d) communicating said test taker biometric data to the central station and comparing said test taker biometric data with said verified biometric data to thereby verify said test taker biometric data;

(e) making test question data from the central station available at the remote test station;

(f) storing test response data, input in response to said test question data;

(g) recording and storing audio/video proctoring data of said testing event;

(h) ending said testing event; and (i) validating said testing event by reviewing said proctoring data for invalidating events.

11. The method according to claim 10, further including the step of assigning an unique identifier to said testing event.

12. The method according to claim 11, wherein said step (a) of storing said verified biometric data further comprises the steps of qualifying a registrant for a particular test, recording biometric data, collecting payment, and transmitting the recorded biometric data to the central station for storage as said verified biometric data.

13. The method according to claim 12, further comprising the step of issuing a registration card containing registration data.

14. The method according to claim 13, wherein step (c) cannot be performed until said registration data is transmitted to the central station.

15. The method according to claim 13, further comprising the step of printing a record of said testing event including said identifier and said registration data.

16. The method according to claim 10, wherein said step (e) comprises communicating said test data from the central station to the remote test station.

17. The method according to claim 10, wherein said step (e) comprises unlocking test data already at the remote test station.

18. The method according to claim 10, wherein said step (c) further comprises inputting other registrant data.

19. The method according to claim 10, wherein step (e) is carried out only if said test taker biometric data is verified in step (d).

20. A method for controlling the administration of remotely proctored, secure examinations at a remote testing station comprising the steps of:

(a) storing verified biometric data at a central station;

(b) storing test question data at the central station;

(c) inputting test taker biometric data at the remote testing station to begin a testing event;

(d) communicating said test taker biometric data to the central station and comparing said test taker biometric data with said verified biometric data to thereby verify said test taker biometric data;

(e) communicating test question data from the central site to the remote testing station;

(f) storing test answer data input in response to said test question data; (g) recording and storing audio/video proctoring data of the testing event, assigning an identifier to said proctoring data; (h) reviewing said proctoring data during said testing event for indications of invalidating events; and (i) ending said testing event.

21. The method according to claim 20, further comprising the step of assigning an unique identifier to said testing event.

22. The method according to claim 21, wherein the step (a) of storing verified biometric data further comprises the steps of qualifying a registrant for a particular test, recording biometric data, collecting payment, and transmitting the recorded biometric data to the central station for storage as said verified biometric data.

23. The method according to claim 22, further comprising the step of issuing registration card containing registration data.

24. The method according to claim 23, wherein step (c) is not performed until said registration data is input and transmitted to the central station.

25. The method according to claim 24, further comprising the step of printing a record of said testing event including said identifier and said registration data.

26. The method according to claim 20, wherein steps (e) through (i) are carried out only when said test taker biometric data is verified in step (d).

27. A system for controlling the administration of remotely proctored, secure examinations at a remote test station connected to a central station by at least one communication channel, comprising:

said central station, comprising:

means for storing data including test question data, verified biometric data, test response data and proctoring data;

means for comparing test taker biometric data generated at said remote station with said verified biometric data and for generating a control signal when said test taker biometric data matches said verified biometric data; and means for downloading the test question data to said remote test station responsive to said control signal; and at least one said remote test station, comprising:

means for processing data;

data storage means for storing data including the test question data downloaded from the storage means of the central station;

means for measuring said test taker biometric data;

means for recording said test response data and said proctoring data corresponding to a testing event; and means for communicating with said central station and operatively connected to the communications channel for uploading said test taker biometric data to said central station, for downloading said test question data from said storing means of said central station when said test taker biometric data matches said verified biometric data, and for uploading said test response data and said proctoring data to said storing means of said central station, under control of said processing means.

28. The system according to claim 27, wherein said proctoring data comprises audio/visual data of said testing event.

29. The system according to claim 27, wherein said test taker biometric data comprises a fingerprint.

30. The system according to claim 27, wherein recording means further comprises means for recording the generation of said test taker biometric data.

31. A method for controlling a testing system administered from a central station and providing remotely proctored, secure examinations at a remote testing station, said method comprising the steps of:

storing verified biometric data at the central station;

storing test question data at the central station;

generating test taker biometric data at the remote testing station at the beginning of a testing event;

providing the test taker biometric data to the central station;

comparing the test taker biometric data with the verified biometric data; and when the test taker biometric data matches the verified biometric data, making the test question data from the central station available at the remote test station to thereby continue with the testing event.

32. The method as recited in claim 31, wherein said method further comprises the steps of:

recording and storing audio/video proctoring data of the testing event;

completing the testing event; and validating the testing event by reviewing the proctoring data for invalidating events at the central station.

33. A method for controlling a testing system administered from a central station and providing remotely proctored, secure examinations at a remote testing station, said method comprising the steps of:

storing verified biometric data at the central station;

storing test question data at the remote testing station;

generating test taker biometric data at the remote testing station at the beginning of a testing event;

providing the test taker biometric data to the central station;

comparing the test taker biometric data with the verified biometric data; and when the test taker biometric data matches the verified biometric data, transmitting key data for unlocking the test question data stored at the remote test station to thereby continue with the testing event.

34. The method as recited in claim 33, wherein said method further comprises the steps of:

generating proctoring data of said testing event;

validating said testing event by reviewing the proctoring data for invalidating events at the central station;

completing said testing event; and immediately issuing a validated test report.

35. A method for controlling a testing system administered from a central station and providing remotely proctored, secure examinations at a remote testing station, said method comprising the steps of:

storing verified biometric data at the central station;

storing test question data at one of the central station and the remote testing station;

generating test taker biometric data at the remote testing station at the beginning of a testing event;

providing the test taker biometric data to the central station;

making the test question data available at the remote test station to thereby permit completion of the testing event;

comparing the test taker biometric data with the verified biometric data; and when the test taker biometric data does not match the verified biometric data, invalidating the testing event.

36. The method as recited in claim 35, wherein said method further comprises the steps of:

recording and storing audio/video proctoring data of the testing event;

completing the testing event; and validating the testing event by reviewing the proctoring data for invalidating events at the central station.

37. The method as recited in claim 35, wherein all of the recited steps are performed in the recited order.

* * * * *